(12) United States Patent
Saha et al.

(10) Patent No.: US 7,478,210 B2
(45) Date of Patent: Jan. 13, 2009

(54) MEMORY RECLAMATION WITH OPTIMISTIC CONCURRENCY

(75) Inventors: Bratin Saha, San Jose, CA (US); Richard L. Hudson, Florence, MA (US); Ali-Reza Adl-tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 11/450,616

(22) Filed: Jun. 9, 2006

(65) Prior Publication Data

US 2007/0288708 A1 Dec. 13, 2007

(51) Int. Cl.
*G06F 12/12* (2006.01)
(52) U.S. Cl. ................. 711/159; 711/160; 707/206
(58) Field of Classification Search ........... None
See application file for complete search history.

(56) References Cited

U.S. PATENT DOCUMENTS

| | | | | |
|---|---|---|---|---|
| 5,237,673 | A * | 8/1993 | Orbits et al. | 711/170 |
| 6,529,948 | B1 * | 3/2003 | Bowman-Amuah | 709/217 |
| 6,732,124 | B1 * | 5/2004 | Koseki et al. | 707/202 |
| 7,349,958 | B2 * | 3/2008 | Chambliss et al. | 709/223 |

* cited by examiner

*Primary Examiner*—Than Nguyen
(74) *Attorney, Agent, or Firm*—Blakely, Sokoloff, Taylor & Zafman LLP

(57) ABSTRACT

Memory reclamation with optimistic concurrency is described. In one example an allocated memory object is tentatively freed in a software transactional memory, the object having pointers into it from at least one transaction. A time when all transactions that are outstanding at the time an object is tentatively freed have ended is detected, and the object is actually freed based on the detection.

19 Claims, 7 Drawing Sheets

```
transaction {
    foo = malloc(size);
} transaction {
    free(foo);
}
```

FIG. 1

```
/*
 * Pseudo code for non-blocking push and
 * pop routines for 16K blocks.
 */
void lifoQueuePush(block, queue)
{
  do {
  oldVal = queue->top;
  [oldCount, oldBlockPtr] =          unpack(oldVal);
    newCount = oldCount + 1;
    block->next = oldBlockPtr;
    newVal = pack(block, newCount);
    } while(!CAS64(&queue->top,oldVal, newVal));
  return;
} block lifoQueuePop(queue)
{
  do {
    oldQueue = queue->top;
    [oldCount, blockPtr] = unpack(oldQueue);
    if (blockPtr == NULL) {
    /* The queue is empty */ return NULL;
    }
    newCount = oldCount + 1;
    newBlockPtr = blockPtr->next;
    newQueue = pack(newCounter, newBlockPtr);
    } while (!CAS64 (&queue->top, oldQueue, newQueue));
  return blockPtr;
}
```

FIG. 2

```
freeListPush (object)
{
  do {
  oldPublicFreeList = publicFreeList;
  object->next = publicFreeList;
  } until CAS(&publicFreeList, object, oldPublicFreeList);
} repatriatePublicFreeList ()
{
  temp = SWAP(publicFreeList, NULL);
  temp->next = privateFreeList;
  privateFreeList = temp;
}
```

FIG. 3

```
transaction

{
  for (i=0; i<big_number; i++) {
    foo = malloc(size);
    free(foo);
  }
} /* is safe for space */
```

FIG. 4

```
transaction
{
  foo = malloc(size);
  abort();
} /* is safe for space */
```

FIG. 5

```
transaction {
  foo = malloc(size1);
  goo = malloc(size2);
  transaction {
    free(foo); /* not balanced */
    bar = malloc(size3);
    free(bar); /* balanced */
  }
  free(goo); /* balanced */
}
```

FIG. 6

```
transaction {
  foo = malloc(size);
} transaction {
  free(foo);
}
```

FIG. 7

```
transaction { // seqNumber=1
  transaction { // seqNumber=2
    transacttion { // seqNumber=3
      foo = malloc(size); // seqNumber=3
      bar = malloc(size); // seqNumber=3
    }
  }
  transaction { // seqNumber=4
    free(foo); // 3 < 4,speculatively free
  }
  free(bar); // 3 > 1, balanced free
}
```

FIG. 8

```
nodeDelete(int key) {
  ptr = head of list;
  transaction {
    while( ptr->next->key != key ) { ptr = ptr->next;
    } /* end while */
    temp = ptr->next;
    ptr->next = ptr->next->next;
  } /* validate & end transaction */
  free(temp); /* Anyone using temp? */
}
```

FIG. 9

```
While (1) {
  For all currently active transactions {
    Find the earliest epoch at which any transaction
started, (call it E).
    safeToFreeEpoch = E - 1
  }
  currentFreeEpoch++;
  park ( );
}
```

FIG. 10

```
Tag block being freed with the current value of
currentFreeEpoch

Add freed block to head of FIFO speculative free list
FreeLabel:

While (there are entries in the speculative free list) {
  If (epoch of block < safeToFreeEpoch)
    Free block;
  Else break;
}
If length of speculative free list > highThreshold {
  Validate all currently active transactions;
  If (transaction does not validation) abort transaction;
  Goto FreeLabel;
}
```

MEMORY RECLAMATION WITH OPTIMISTIC CONCURRENCY

FIELD

The present description relates to memory management and software transactional memory (STM) in multiple threaded systems, and in particular to reclaiming explicitly managed memory in the presence of optimistic concurrency.

BACKGROUND

Future generations of multiple core processors and multiple thread processors will provide an increasing number of threads on a single die. To exploit the computational power of these processors, alone and in multiple processor groupings, language runtimes must scale to a large number of threads and provide new primitives that simplify concurrent programming. In a cache-coherent shared memory platform, a memory allocator is used to allocate memory to each thread. The memory allocator plays an important role in scalability and cache locality optimizations. To enable applications to exploit concurrency to the maximum, the memory allocator needs to employ non-blocking algorithms to avoid becoming a scalability bottleneck. However, transactional programming, which provides a powerful tool for easing concurrent programming; is not integrated with memory allocation and deallocation.

There is a tension between explicit memory management and optimistic concurrency that might be used in software transactional memory. Explicit memory management relies on the application writer to know when a piece of memory is no longer going to be referenced by other parts of the application. Software transactional memory and, more generally, optimistic concurrency predicts that the state of the heap will not change until the transaction commits. The software transaction memory mechanism checks for potential changes when the transaction commits. While a transaction that uses an object that is being freed will abort, the internal mechanisms of the transaction operate best if the memory is not reclaimed until all potential conflicts have been detected.

This tension has been relieved through reference counting, hazard pointers, etc. However, these approaches require atomic operations when accessing pointers to shared memory which makes them expensive to implement.

This tension has also been relieved by requiring the application to execute a series of instructions at every read and write operation to a shared pointer. These operations essentially added the shared pointer to a "root set". The memory manager would traverse the root set to figure out whether objects were reachable. Traversing the root set may be impractical for large synchronization blocks.

Space leaks in the presence of large running transactions present additional difficulties. Space leaks may be avoided in memory allocation/deallocation inside transactions by deferring the freeing of memory until a transaction commits. While this is semantically correct, it does not protect from space leaks in the presence of large transactions.

BRIEF DESCRIPTION OF THE FIGURES

The invention may be more fully appreciated in connection with the following detailed description taken in conjunction with the accompanying drawings, in which like reference numerals refer to corresponding parts throughout the several views of the drawings, and in which:

FIG. 1 shows an example of pseudo code to push and pop off the block store's queue according to an embodiment of the invention;

FIG. 2 shows an example of pseudo code to push objects onto a free list and repatriate a public free list according to an embodiment of the invention;

FIG. 3 shows an example of pseudo code to hold both a malloc and a free according to an embodiment of the invention;

FIG. 4 shows an example of pseudo code to speculative allocate according to an embodiment of the invention;

FIG. 5 shows an example of pseudo code for a speculative free transaction according to an embodiment of the invention;

FIG. 6 shows an example of pseudo code for simple transactional malloc and free according to an embodiment of the invention;

FIG. 7 shows an example of pseudo code for nested allocation and freeing according to an embodiment of the invention;

FIG. 8 shows an example of pseudo code to delete a node in a linked list according to an embodiment of the invention;

FIG. 9 shows an example of a pseudo code daemon thread mechanism according to an embodiment of the invention;

FIG. 10 shows an example of a pseudo code freeing mechanism according to an embodiment of the invention;

DETAILED DESCRIPTION

Figure 11:
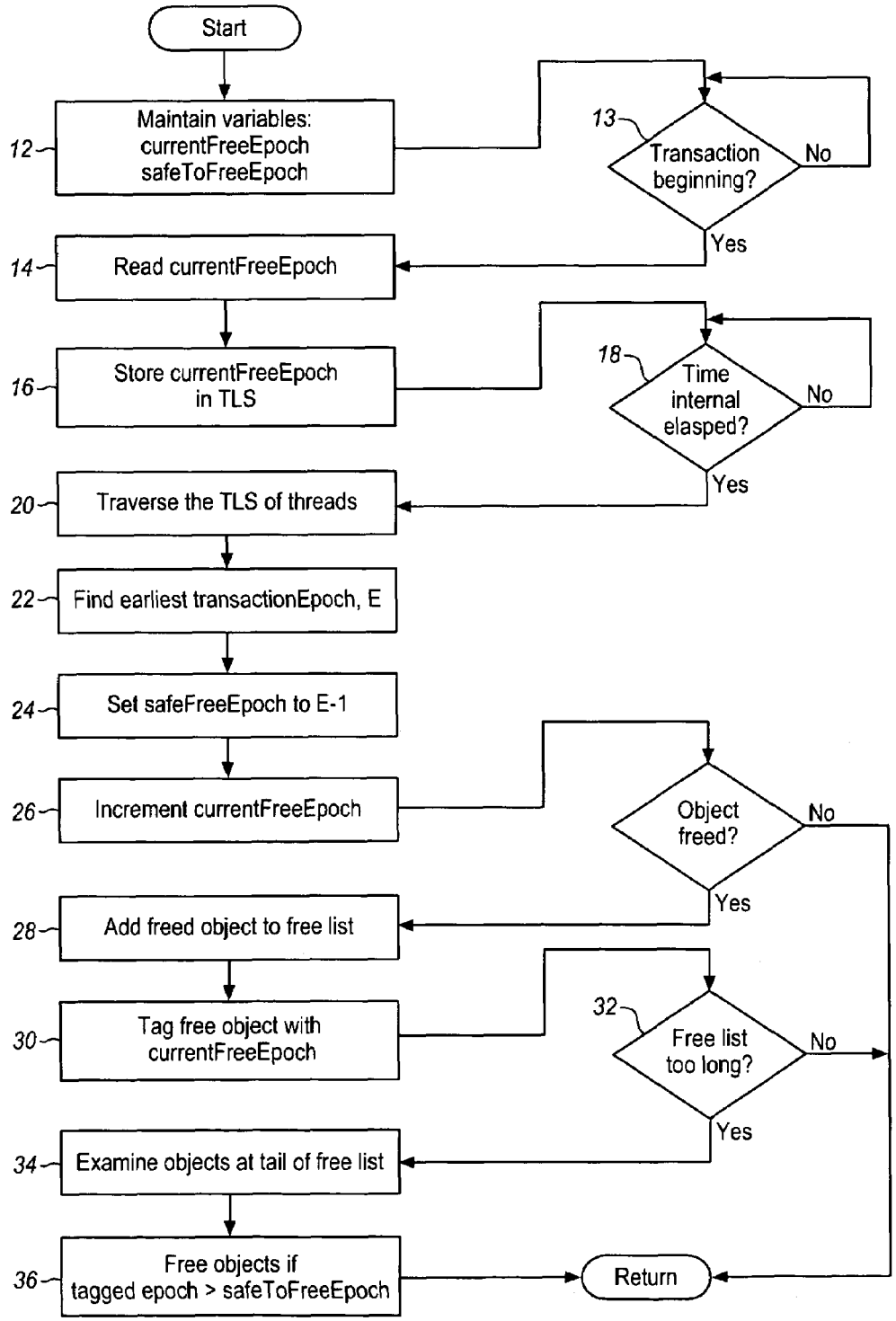
FIG. 11 is a process flow diagram of the daemon thread mechanism of FIG. 9 according to an embodiment of the invention.

This description presents an approach to reclaim explicitly managed memory using malloc/free (memory allocation/free) and similar types of commands and instructions in the presence of optimistic concurrency. Optimistic concurrency can occur both with transactional synchronization as well as with non-blocking synchronization. The described approach may be applied in unmanaged runtimes for threaded applications. As described below, atomic operations are avoided, reads and writes require no additional overhead within the synchronization block, and space leaks are handled even with large transactions.

The described approach may be applied to memory reuse in the presence of transactions and is consistent with hardware support for transactions. The described approach may also be applied to efficient memory management with non-blocking algorithms. Non-blocking algorithms have a number of advantages and are frequently used for concurrent structures. With the advent of multicore architectures library writers may increasingly turn to non-blocking algorithms.

According to one embodiment of the invention, a non-blocking, scalable memory management approach is presented. The malloc and free fast paths avoid expensive compare-and-swap operations by accessing only thread-local data. Since the memory allocator is non-blocking, it avoids becoming a scalability bottleneck and can be used by other highly tuned libraries. This approach provides a transaction-aware memory allocator.

For example, memory allocated inside aborted transactions appears never to have been allocated. Moreover, this memory allocator operates correctly in the presence of nested transactions with partial rollback. For example, memory allocation in a parent transaction is not rolled back if a child transaction is aborted. Rather than layer the memory allocator on top of the STM (Software Transactional Memory), the memory allocator may be tightly integrated with the STM. This provides several benefits. It improves the performance of malloc and free operations inside transactions by avoiding the overhead of STM. It improves the space efficiency of these operations by recycling memory that is allocated and freed within a transaction. It also allows the STM to perform object-level contention detection by leveraging the memory allocator's metadata.

According to one embodiment of the invention, reachability may be detected in the presence of transactions. A constant overhead per transaction may be maintained, avoiding atomic operations. This may achieve better caching properties.

The memory allocator may allow for update in place (undo-based) software transactional memory. Current STMs use a write-buffering approach, but an undo-logging based approach provides a significant performance advantage. A memory allocator may be leveraged for making other parts of a runtime system more efficient. In addition, abort and commit hooks may be used to provide transactional semantics for system services invoked inside transactions. This may also be used for other services, such as transactional output.

Overview

At initialization, in some example systems, a large piece of virtual memory may be reserved for its heap using, for example, an operating system primitive like the Linux mmap and munmap primitives, and the heap divided into 16K-byte aligned blocks that initially reside in a global block store. When a thread needs a block from which to allocate objects, it may acquire ownership of one from the block store using a non-blocking algorithm as described, for example, below. After acquiring a block, a thread divides it into equal-sized objects initially placed on the block's private free list. The thread owning a block also owns the objects in the block.

Each thread maintains a small thread-local array of bins, each bin containing a list of blocks holding the same sized objects. In one example, the array contains a bin for every multiple of four between 4 bytes and 64 bytes, and a bin for every power of two between 128 bytes and 8096 bytes. Allocation of objects greater than 8096 bytes may be handled by the operating system. For example, with Linux mmap and munmap.

When a thread dies, the scheduler may notify the memory allocator, which then returns the dead thread's blocks back to the block store. Un-owned yet nonempty blocks in the block store are not owned by any thread. These partially filled blocks may be segregated based on object size and managed using the same non-blocking algorithms used for the empty blocks. When sufficiently empty, a block may be distributed to another thread, which then takes ownership of the block's objects.

The base of each block may include a 64-byte structure holding the block's meta-data. With the exception of a public free list field, the fields in the metadata block may all be local to the owning thread and therefore be considered to be thread safe. To facilitate efficient insertion and deletion, the next and previous fields may support the doubly-linked list of blocks in each bin. There may be a field indicating the size of objects in the block, a field tracking the number of objects in the block, and a field tracking the number of objects that have been allocated. Per-object headers are not needed by the base memory allocator since all relevant information is held in the block's meta-data. Table 1 provides an example set of metadata block fields that may be used and their related functions.

TABLE 1

| Metadata Block Fields: | Function |
| --- | --- |
| next | Pointer to the next block in the bin if owned by a thread or next available block |
| previous | Previous block in double linked bin or free list |
| object size | indicates size of largest object in block |
| number of objects | indicates total number of objects in block |
| number of allocated, unavailable objects | indicates number of unused allocated objects in block |

Each block may have fields for two linked lists of freed objects. A private free list field may be used to point to a linked list of objects available for allocation. The thread may use this list to satisfy memory allocation requests. A public free list field points to a linked list of objects freed by threads that do not own the block. These threads may be referred to as foreign threads. Table 2 provides an example of block fields that may be used and their related functions.

TABLE 2

| Block Fields | Function |
| --- | --- |
| private free list | pointer to list |
| public free list | pointer to list |

Allocating and Freeing Objects

To allocate objects, the requested size may first be rounded up to the next binned size and then one of the blocks in that bin may be allocated. Objects whose size is a power of two may be aligned to that power of two. A search for a block with free space improves performance and works reliably if it balances the amount of information maintained. This allows for a timely response to a call to the memory allocator.

To allocate an object within a block, the thread first checks the block's bump pointer. If the bump pointer is null, the thread allocates the object from the private free list. Otherwise, the thread increments the bump pointer by the size of the object, checks for overflow, and returns the object if there is no overflow. On overflow, the thread sets the bump pointer to null and allocates from the private free list. If the private free list is accessed only by the owning thread, then this allocation algorithm is thread safe.

If the private free list is empty then the thread examines the public free list to see if it has any objects to repatriate. A thread may repatriate the objects on the public free list of a block that it owns by moving those objects to the block's private free list using a non-blocking thread safe algorithm.

An object may be freed based on whether the thread performing the free owns the freed object. To free an object it owns, a thread may place the object on the private free list of the block containing the object, a thread safe operation. To free an object it does not own, a thread may place the object on the public free list of the object's block using a more expensive non-blocking atomic operation.

Non-Blocking Operations

Performance may be further improved by minimizing the use of CAS (Compare and Swap) instructions in implementing the non-blocking algorithms. This may be done in at least two ways: (1) the bits freed up due to the alignment of the blocks are used to obtain non-blocking properties, (in particular to avoid the ABA problem), and (2) two free lists are maintained, one private and trivially non-blocking, and another a public version which is managed as a single consumer, multiple-producer queue and implemented as a non-blocking structure.

The ABA problem is a classic concurrency problem, publicly identified in the IBM 370 manual along with the introduction of the CAS instructions. Assume a LIFO (Last In First Out) queue implemented as a linked list with A>B>C on it. Assume thread one inspects A, noting B is the next object on the queue and is then delayed. If thread 2 pops A, pops B, and then pushes A, then the queue holds A>C. If thread 1 then CASes the queue, it will find an A as it expects but instead of replacing it with C as it should, it will replace it with B. The root of the problem is related to an assumption that if A does not change, then A's next field does not change.

Initially each block in the heap is publicly owned and resides in the block store. The block store manages the blocks using a non-blocking concurrent LIFO queue data structure. In one example, the queue is maintained as a linked list threaded through the first word of an aligned 16K block. Any block in a 32-bit address space requires 18 bits to address that block. The lower 14 bits of a block's address are always zero. To avoid ABA problems, the queue may use a versioning scheme and a 64-bit CAS instruction. The version number uses 46 bits leaving 18 for the block's address. The question then becomes whether 46 bits is sufficient to prevent rollover and the ABA problem.

For the queue with a 64 bit CAS, 18 bits may be needed to address the blocks, leaving 46 bits available for versioning. If the bytes are allocated at 1 byte per cycle, then, on a 3 Gigahertz machine, 3,000,000,000 bytes per second would be allocated. This would require 181,422 blocks per second. Wrap around would take slightly over 12 years and wrap around would only be a problem if a thread were suspended at just the right time and stayed suspended for the requisite 12 years. A 64 bit computer would require a 128 bit (16 byte) double wide CAS instruction. The locked cmpxchg16b instruction provided by the x86 is an example of such an instruction and trivially provides for a full 64 bits of versioning which is sufficient.

FIG. 1 shows an example of pseudo code for pushing and popping off the block store's queue. In the example of FIG. 1, the public free list holds objects that were freed by foreign threads. Adding an object to a public free list is expensive since it requires an atomic CAS instruction on a cache line that is likely to be in another processor's cache. To push an object onto the public free list, the public free list may be loaded from the block's metadata, the next field in the object is assigned to this, and a CAS is done. If the CAS succeeds, then the object has been successfully pushed. If not, then the process may be repeated as many times as is required.

FIG. 2 shows an example of pseudo code for pushing objects onto a free list and repatriating a public free list. To repatriate the public free list, a thread (1) atomically swaps the public free list field with null (using, for example the IA32 locked exchange instruction), and (2) sets the private free list field to the loaded public free list value. This is ABA safe without concern for versioning because the concurrent data structure has a single consumer (the owning thread) and multiple producers. Since neither the consumer nor the producer rely on the values in the objects, the faulty assumptions associated with the ABA problem are avoided.

Framework for Managing Blocks

The blocks in any particular size bin may be arranged in a circular linked list with one of the blocks distinguished as the bin head. As memory allocation traverses this linked list looking for a free object, it may collect per bin statistics including how many free objects are encountered upon arriving at a block and how many blocks are on the list. A complete traversal may be noted when the thread encounters the distinguished bin head block. The collected statistics may be used to set policy for the next traversal. A policy may include whether additional blocks should be allocated to the bin or the empty blocks returned to the main store. These operations may be repeated for each full traversal of the list.

In one example, a policy may be that if less than 20% of the objects are free and available, then blocks are added, and if a block becomes completely empty, it is returned to the block store. A further enhancement may be made by adding a new block for the bin if, for example, 10 blocks are inspected without finding a free object. This places an upper bound on the time that memory allocation will take before returning an object. Accordingly, the distinguished bin head block may be used as a hook to set policy and the traversal of the blocks to collect the statistics may be used to set the policy.

Transaction Aware Allocation

The memory allocator may be tightly coupled with a software transactional memory (STM) module, that is also part of the runtime. The memory allocator may be augmented to handle allocation/deallocation inside transactions and thereby be still more tightly coupled with STM.

In one example, STM uses two-phase locking for enforcing transactional semantics. In this example, all memory locations are mapped to a unique lock. The lock may either be owned by a transaction, orbit may contain a version number. Before writing to a location, transactions acquire the lock (these may be referred to as write-locks) guarding the location, and log the old value. Before reading a location, transactions check that no writer has acquired the lock (these may be referred to as read-locks) for the location, and log the version number of the lock. Prior to commit, the transaction checks that the version number of the read-locks have not changed. During commit the transaction also increments the version number and releases the write-locks. Since this STM uses optimistic concurrency, transactions may read and execute with stale values, in particular stale pointer values. However, these transactions will not commit.

Memory locations may be mapped to the unique lock either at the granularity of the address or at the granularity of an object. To achieve object granularity, each object may be augmented with an object header placed before the object. In one example, all objects within a block are the same size and, therefore, the headers for these objects all fall at known, easily determined, offsets from the base of the block. In this case, the start of an object may be determined easily from any address within a block.

For handling allocations inside transactions, the memory allocator may be configured to address two specific issues, among others. (1) Transactional semantics for allocations: for example all memory allocated inside a transaction is rolled back on an abort. (2) Recycling memory: for example memory may be recycled only when it becomes truly unreachable. Due to optimistic concurrency, some transactions may hold stale pointers into freed memory; the memory allocator may be configured to ensure such memory is not recycled.

In one example, memory management is done inside transactions by treating the entire allocation/deallocation code sequence as part of the transaction. In other words, the malloc code is treated as ordinary loads and stores. The STM is reused to provide transactional semantics. In another example, the allocation routines implement transactional semantics independent of the STM. The later approach offers a few benefits under some circumstances. Four such benefits are described below.

(1) The memory allocation sequence is not slowed for non-transactional code by the use of read and write barriers throughout the allocation sequence. If most allocation happens outside transactional regions, then to avoid paying any overhead for non-transactional allocations, two versions of every function used in the allocation sequence may be needed. One would be used for non-transactional allocation and the other would be used for transactional allocation. If the STM does not guarantee strong atomicity, that is if transactional code is not atomic with respect to non-transactional code, then a non-transactional thread may not be able to allocate concurrently with a transactional thread.

(2) Making the allocation transactional provides a benefit of undoing allocation activity if a transaction aborts. However, making the allocation transactional may not help in detecting when memory becomes unreachable and ready for recycling.

(3) Special actions may still be needed to prevent memory freed inside a transaction from being reused inside a non-transactional thread through the global allocation pool.

(4) The STM itself may need to allocate memory for its internal structures. This creates a cyclic dependency where the malloc uses the STM, and the STM reuses the malloc. The dependency can be resolved, with some complication to the system.

Transactional Allocation

Transactional allocation and deallocation may be characterized in a variety of ways. (1) "Speculatively allocated" may be used to characterize memory allocated inside a transaction. The allocation may be denoted as valid if the transaction commits, but may be rolled back if the transaction aborts. (2) "Tentatively freed" may be used to characterize memory allocated outside a transaction, but freed within a transaction. If the transaction aborts, the freeing may be rolled back so that the memory remains valid. (3) "Balanced allocated" may be used to characterize memory that is both allocated and freed inside a transaction. No special action may be needed on a commit or abort since the memory is essentially transaction local.

In one example, to enforce transactional semantics, allocation actions may appear to other threads only at transaction commit. For example, memory may be presented to the free routines (described below) only at transaction commit. For this rule, the memory allocator may be configured to provide some guarantees against space blowup. The memory allocator may ensure that balanced allocations and repeated speculative allocations do not lead to space blowup.

The transaction in the pseudo code example of FIG. 3 shows a loop holding both a malloc and a free (free (foo)). If the STM were to delay the freeing until the transaction completes there may be a risk of space blowup and depleted memory resources.

FIG. 4 shows an example of speculative allocation. This approach will work well for speculative allocation, however, if the STM does not free the malloced object as shown in FIG. 4 space blowup may also occur.

Tentatively freed memory may be used to increase the usage of the available memory space, however, the increase in space usage may be limited by the amount of memory that was allocated prior to a particular transaction. As with the examples above, there are some producer-consumer use scenarios where space blowup may be an issue. One such scenario involves one thread allocating memory non-transactionally (or allocating transactionally and then committing the transaction), while another thread tries to free the memory transactionally.

Nested Transactions

The STM may support nested transactions with partial aborts. Nested transactions in this context may be characterized as being executed in the same thread as the parent. In a closed nesting model, the commit of child transactions is contingent upon the commit of the parent transaction. Updates made by a child transaction are visible to other threads only when the parent transaction commits. When a parent transaction aborts, it also rolls back the actions of the child transaction. However, an abort of a child transaction does not roll back the actions of the parent transaction.

Such nested transactions make it more difficult to detect balanced allocations which may be important for providing space guarantees. The code sequence in FIG. 5 may be applied for tentative free transactions. With this sequence, however, the inner transaction may get aborted which means that the free(foo) is not balanced.

FIG. 6 shows an example pseudo code sequence for simple transactional malloc and free. This sequence uses transaction nesting depth to detect tentatively freed and balanced objects. The sequence becomes expensive to implement. When a top level transaction commits, the nesting depth of all allocated objects would have to be adjusted so that a subsequent transactional region can detect tentatively freed objects.

A sequencing approach may be used to detect balanced allocations. For such an approach, every transaction increments a thread-local ticket when it starts. Nested transactions have a different ticket number from their parents. A transaction creates a sequence number by concatenating the thread id and the ticket number. Every object allocated inside a transaction is tagged with its sequence number. If an object was allocated in a different thread, as for example detected from the sequence number, then any transactional free is a tentative free. If the object was allocated by the same thread and its sequence number is less than the sequence number of the transaction in which it is being freed, then the transactional free is a tentative free. FIG. 7 is an annotated pseudo code example of nested allocation and freeing showing how sequence numbers may be used to detect balanced frees.

Handling Deferred Actions

In one example, the STM exports callbacks that are invoked when a transaction is committed or aborted. The memory allocator uses these callbacks to handle deferred actions. The callbacks process two auxiliary data structures, an undo log, and a commit log. On a transactional allocation, the sequence number of the current transaction is added to the object header, and the object is placed in the undo log. On a transactional free, the free is first checked to determine whether it is tentative or balanced. For a balanced free, the object is removed from the undo log (the transactional allocation would have added the object to the undo log), and then the object is added to the block freelist, just like a normal free. For a tentative free, the object is, placed in the commit log.

When a transaction commits, the commit callback processes the commit log. Any tentatively freed objects that have now become balanced may also be freed. If the top level transaction commits, then the undo log is reset. In this example, the commit log objects are freed only at the top level commit. At the top level there may be no need to check whether an object was allocated balanced. Instead, all the commit log objects may be freed. This creates the possibility of a space blowup. However, with this approach, the risk is mitigated by supporting eager freeing at nested transactions.

When a transaction aborts, the abort callback may process the undo log and free the speculatively allocated objects. This traversal is efficient since objects are added to the undo list as they are allocated. Hence, all the objects allocated in the aborted transaction are contiguous and at the end of the undo list. The commit log may also be restored to its state before the aborted transaction started. This rolls back all the tentative frees; the commit log restore is similar to the general STM mechanism for handling read/write sets for nested transactions.

Implementation Considerations

The overhead may be minimized or at least reduced in a variety of different cases, such as non-transactional allocation, and transactions without any allocation. To minimize non-transactional allocation overhead, the memory allocator may check at the beginning whether the memory allocator is inside a transaction, and if not, execute a conventional memory management code. This may be done, for example using a TLS (Thread Local Storage access. As a result, non-transactional allocation only requires one additional access to a TLS field. This improvement may be enhanced further if the STM maintains a transaction local structure in the TLS (called the transaction descriptor) that holds transaction related metadata. Extra fields may be added in the descriptor to note whether there has been any allocation activity inside a transaction. If there was no allocation activity, the commit/abort hooks may remain disabled, and the transaction commit/abort code does not consume any additional overhead.

Critical Sections !=Transactions

There is a natural tension between an explicit malloc/free and STMs. This tension may cause a problem that shows up in languages such as C and C++ where transactions cannot simply replace mutual exclusion critical sections without consideration for how explicit malloc/free memory allocation is handled. FIG. 8 shows a simplified pseudo code sequence to delete a node in a linked list. Similar code may also be written using a mutex and a critical section. The function traverses a list to find a node with a given key and then unlinks it from the list Assume multiple threads try to delete a node with a given key. With an optimistic transaction, multiple threads may get a pointer to the same node (same value of temp). Typically, one of the transactions will commit, while the remaining will ultimately abort. The committing transaction unlinks the node, but unfortunately does not know when it is safe to free the node since some active transactions may still have a pointer to it.

The same problem occurs with a non-blocking algorithm because multiple threads may try to perform a task, and some threads may obtain a stale pointer. The conflict may be avoided by doing additional work at every read and write to record accesses, maintain lists or the like and by performing additional atomic operations.

Freeing Stale Objects

The conflict may be avoided more efficiently. In one example, after an object is tentatively freed, the memory manager may wait until the object becomes truly unreachable and then actually free the object. In this example, only those transactions that were started before the object is tentatively freed will have pointers into the object. Transactions started after the object is tentatively freed will be restricted from having any pointers into the transaction. Therefore, by detecting when all transactions that are outstanding at the time an object is tentatively freed have ended, the memory manager can actually free the memory without risk of conflict.

The memory manager may use a daemon thread for this detection. An example of such a daemon thread is shown in the process flow diagram of FIG. 11. As shown in FIG. 11, at block 12, the daemon maintains two variables: currentFreeEpoch and safeToFreeEpoch. These variable names are provided as examples only. The currentFreeEpoch variable may be used to represent the epoch the system is currently in. The safeToFreeEpoch variable may be used to represent the epoch for which tentatively freed objects may be actually freed. Objects tentatively freed in older epochs may also be actually freed. In the present example, "epoch" is used to refer to a time span during which objects may have been allocated or freed and transactions may have been started, committed or aborted.

In the example of FIG. 11, every transaction, at block 14, reads the variable currentFreeEpoch at the beginning 13 and at block 16 stores it in the TLS in a thread local variable called transactionepoch. The variable transactionEpoch then represents the epoch the transaction was started in.

At block 18, the daemon thread wakes up at intervals, traverses the TLS of the threads at block 20, and, at block 22, finds the earliest transactionepoch value, E, of all the currently active transactions. It then sets safeToFreeEpoch to be E minus 1 at block 24, and increments the value of currentFreeEpoch at block 26.

When an object is freed (inside or outside a transaction), it is added at block 28 to the head of a thread local FIFO tentative free list, and at block 30, it is tagged with the current value of currentFreeEpoch. If the tentative list grows beyond a threshold at block 32, then the thread examines the objects at the tail of the list at block 34, and frees (for real) objects whose tagged epoch is earlier than the current value of safeToFreeEpoch at block 36. This is safe since, by design, all currently active transactions started after the safeToFreeEpoch, while the objects were freed before the safeToFreeEpoch.

Long running transactions and transactions containing an infinite loop may be provided special consideration. If some thread runs out of memory, or finds that its tentative free list has grown beyond a high water mark, it may validate all active transactions. If a transaction has a pointer to tentatively freed memory, then the transaction may be aborted and cleaned up. If a transaction does not have a stale pointer to freed data, then it may be restricted from acquiring such a pointer in the future. This provides for a space leak, at the cost, however, of consuming somewhat more memory. FIG. 9 shows an example of a pseudo code daemon thread mechanism.

FIG. 10 shows an example of a corresponding freeing mechanism. In one example, a daemon thread is not used, a data structure is used that consists of fixed sized buffers that are linked together. When a buffer fills, then the application thread (also called a mutator thread) performs the actions safeToFreeEpoch and currentFreeEpoch updates and performs the appropriate free actions.

Figure 12:
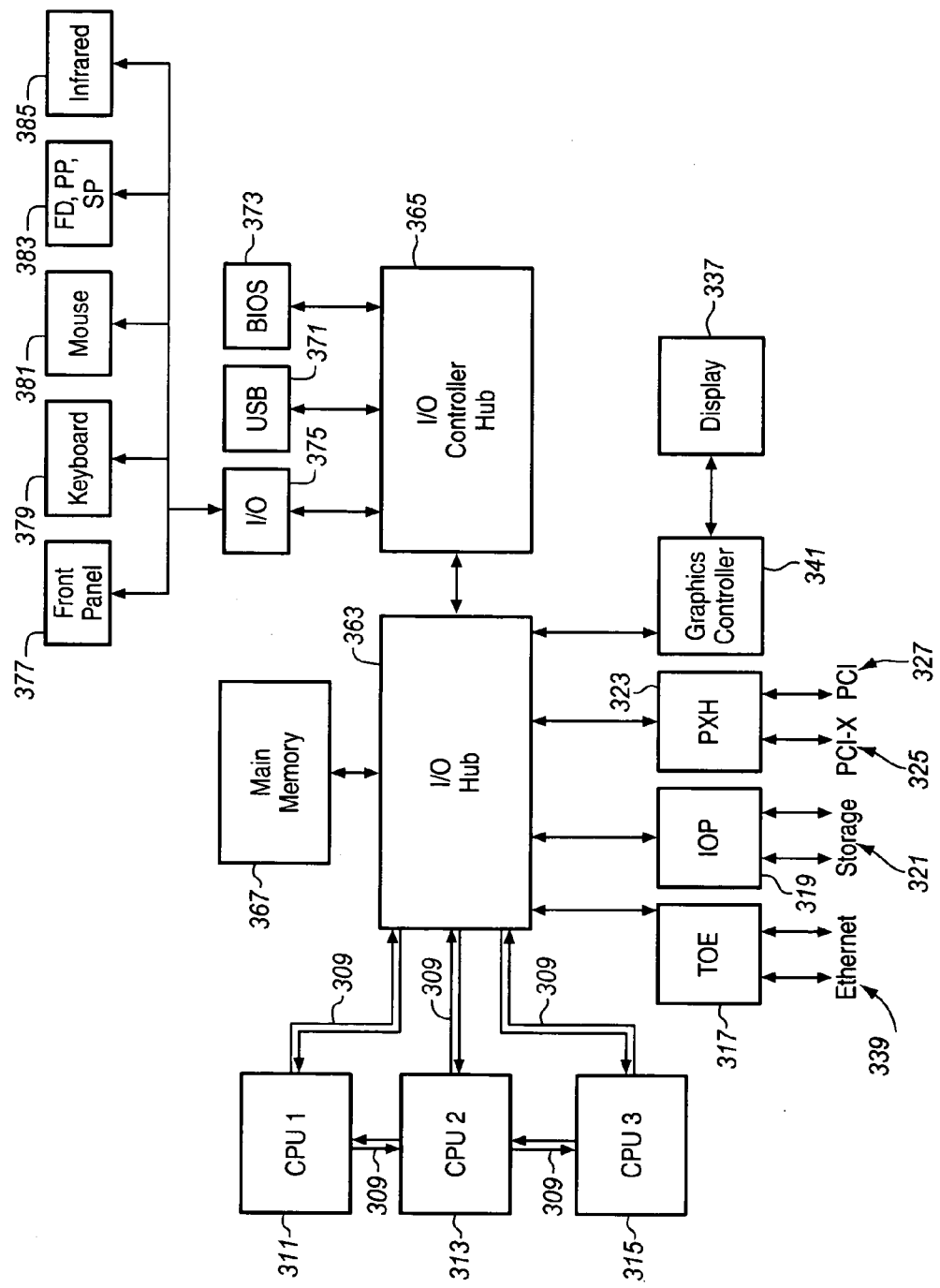
FIG. 12 is a block diagram of a computer system suitable for implementing embodiments of the present invention.

FIG. 12 shows an example of a computer system suitable for implementing the present invention, both in a run-time environment and as a compiler. An IOH (Input/Output Hub), north bridge, or host controller 363 interfaces one or more CPUs (central processing unit) with memory and I/O devices and may provide a wide range of other features such as increased performance, reliability, availability and serviceability, and system management. It may include I/O clusters, a memory controller, snoop filters, and a wide range of logic for handling transactions. While the example of FIG. 4, includes a microprocessor coupled to an IOH and an ICH (Input/Output Controller Hub), either the IOH or the ICH or both or any of the functions of these chips may be incorporated into any one or more of the microprocessors. The IOH and the ICH may also be combined, in whole or in part, inside of or outside of the microprocessor.

In the example of FIG. 12, the IOH 363 has a communications link 309 for each of three CPUs or processor cores 311, 313, 315. More or less than one IOH, three processor cores and communications links may be used. Alternatively, the communications links may be removed so that all of the CPUs communicate through one of the other CPUs or the IOH.

The IOH provides additional connectivity to other devices. There is an interface to system memory 367, such as DIMMs (Dual In-line Memory Modules) in which instructions and data may be stored, and a high speed interface, such as PCI (peripheral component interconnect) Express. The PCI Express interface may be used to couple to a variety of different high and low speed devices. In the example of FIG. 4, six PCI Express x4 lanes are shown. Two lanes connect to a TCP/IP (Transmission Control Protocol/Internet Protocol) Offload Engine 317 which may connect to network or TCP/IP devices such as a Gigabit Ethernet controllers 339. Two lanes connect to an I/O Processor node 319 which can support storage devices 321 using SCSI (Small Computer System Interface), RAID (Redundant Array of Independent Disks) or other interfaces. Two more lanes connect to a PCI translator hub 323 which may support interfaces to connect PCI-X 325 and PCI 327 devices. Two, four or more lanes of PCI Express couple to a graphics controller 341 to render images or video on a display 337. The PCI Express interface may support more or fewer devices than are shown here. In addition, the IOH may be adapted to support other protocols and interfaces instead of, or in addition to those described.

The IOH may also be coupled, using PCI Express or another bus to an ICH. The ICH 365 offers possible connectivity to a wide range of different devices. Well-established conventions and protocols may be used for these connections. Alternatively, these connections may be provided using the PCI interface 327 or another interface. The connections may include a SIO (Super Input/Output) port 375, a USB hub 371, and a local BIOS (Basic Input/Output System) flash memory 373. The SIO (Super Input/Output) port 375 may provide connectivity for a front panel 377 with buttons and a display, a keyboard 379, a mouse 381, and infrared devices 385, such as IR blasters or remote control sensors. The I/O port may also support floppy disk, parallel port, and serial port connections 383. Alternatively, any one or more of these devices may be supported from a USB, PCI or any other type of bus or interconnect. Wireless interfaces such as Bluetooth and WiFi may also be supported from any one or more of these busses.

The particular nature of any attached devices may be adapted to the intended use of the device. Any one or more of the devices, buses, or interconnects may be eliminated from this system and others may be added. For example, video may be provided on the PCI bus, on an AGP bus, through the PCI Express bus or through an integrated graphics portion of the host controller or a processing core.

A lesser or more equipped memory allocator, STM, public and private free-list, tagging approach, and computer environment than the examples described above may be preferred for certain implementations. Therefore, the configuration of the software transaction memory, locks, objects, memory allocation, and computer system will vary from implementation to implementation depending upon numerous factors, such as price constraints, performance requirements, technological improvements, or other circumstances. Embodiments of the invention may also be applied to other types of software-driven systems that use different hardware architectures than those shown in the Figures.

While embodiments of the invention have been described in the context of allocating memory and object-oriented programming, embodiments of the invention may also be applied to other compilation and run-time operations and also to other types of programming languages. Embodiments of the invention may also be applied to a wide variety of different hardware with multiple threads, multiple cores, or multiple processors.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those-shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:

starting a transaction of a processing thread;

allocating a memory object to the transaction in a software transactional memory;

storing an epoch value for the start of the transaction in a thread local storage associated with the transaction;

comparing the stored epoch value with stored epoch values associated with other transactions to determine whether the stored epoch value is earlier than the stored epoch values associated the other transactions;

tentatively freeing the allocated memory object in the software transactional memory based on the comparison, the tentative freeing restricting objects started after the object is tentatively freed from having any pointers into the object, the object having pointers into it from at least one transaction;

detecting when all transactions that are outstanding at the time an object is tentatively freed have ended; and actually freeing the object based on the detection.

2. The method of claim 1, further comprising waiting until the object becomes truly unreachable before actually freeing the object.

3. The method of claim 2, wherein waiting comprises waiting by a memory manager.

4. The method of claim 1, wherein the epoch value comprises a start time and wherein storing an epoch value comprises recording a start time in a thread local variable associated with the transaction.

5. The method of claim 4, wherein recording a start time comprises reading a current free epoch value and recording the value as the start time.

6. The method of claim 5, wherein the current free epoch value is maintained by a memory manager and incremented at regular intervals.

7. The method of claim 5, wherein tentatively freeing an object comprises reading the recorded start times and tentatively freeing the object if the associated transaction has the earliest start time among active transactions.

8. The method of claim 1, wherein tentatively freeing an object comprises freeing the object from inside one of the at least one transactions.

9. The method of claim 1, wherein tentatively freeing an object comprises adding the object to a freed list and tagging it with a time stamp.

10. The method of claim 5, wherein tentatively freeing an object comprises adding the object to a freed list and tagging it with the current free epoch value.

11. The method of claim 10, wherein actually freeing the object comprises comparing the tagged value for the object to the current free epoch value and actually freeing the object based on the result.

12. The method of claim 1, wherein actually freeing the object comprises actually freeing the object when a start time for the object is earlier than the earliest start time in the list of active transaction.

13. The method of claim 1, wherein the transactions are nested and wherein detecting when all transactions have ended comprises detecting when a parent transaction in a related group of nested transaction has ended and if so, then treating all of the related transactions as ended.

14. An article including a computer-readable readable medium comprising data that when operated on by the computer causes the computer to perform operations comprising:

starting a transaction of a processing thread;

allocating a memory object to the transaction in a software transactional memory;

storing an epoch value for the start of the transaction in a thread local storage associated with the transaction;

comparing the stored epoch value with stored epoch values associated with other transactions to determine whether the stored epoch value is earlier than the stored epoch values associated the other transactions;

tentatively freeing the allocated memory object in the software transactional memory based on the comparison, the tentative freeing restricting objects started after the object is tentatively freed from having any pointers into the object, the object having pointers into it from at least one transaction;

detecting when all transactions that are outstanding at the time an object is tentatively freed have ended; and actually freeing the object based on the detection.

15. The article of claim 14, wherein storing an epoch value comprises reading a current free epoch value upon starting the transaction and recording the value as a start time in a thread local variable associated with the transaction.

16. The article of claim 15, wherein actually freeing the object comprises comparing the tagged value for the object to the current free epoch value and actually freeing the object based on the result.

17. An apparatus comprising:

a software transactional memory having a plurality of memory objects;

a thread local storage for association with transactions;

an instruction memory having a plurality of transactions each corresponding to one of a plurality of processing threads, each having pointers into allocated memory objects of the software transactional memory;

a memory manager to maintain a free epoch value and to increment the free epoch value at regular intervals and wherein the current free epoch value is recorded as s start time for each of the transactions when the respective transaction begins; and a memory allocator, the memory allocator comparing the stored epoch value with stored epoch values associated with other transactions to determine whether the stored epoch value is earlier than the stored epoch values associated the other transactions, and tentatively freeing an allocated memory object based on the comparisons, the tentative freeing restricting objects staffed after the object is tentatively freed from having any pointers into the object, the object having pointers into it from at least one transaction, detecting when all transactions that are outstanding at the time an object is tentatively freed have ended, and actually freeing the object based on the detection.

18. The apparatus of claim 17, further comprising a list of active transactions, each associated with a stored epoch value, and wherein comparing the stored epoch values comprises traversing the list of stored epoch values to determine relative start times for the transactions.

19. The apparatus of claim 17, further comprising a freed list and wherein tentatively freeing an object comprises adding the object to the freed list and tagging it with the current free epoch value.

* * * * *

UNITED STATES PATENT AND TRADEMARK OFFICE
CERTIFICATE OF CORRECTION

| | | |
|---|---|---|
| PATENT NO. | : 7,478,210 B2 | Page 1 of 1 |
| APPLICATION NO. | : 11/450616 | |
| DATED | : January 13, 2009 | |
| INVENTOR(S) | : Saha et al. | |

It is certified that error appears in the above-identified patent and that said Letters Patent is hereby corrected as shown below:

In column 14, at line 39, delete, "staffed" and insert --started--.

Signed and Sealed this

Ninth Day of November, 2010

David J. Kappos
*Director of the United States Patent and Trademark Office*